Patented Aug. 29, 1939

2,170,809

UNITED STATES PATENT OFFICE 2,170,809

ALKYLATED DIPHENYLOXIDE

Gerald H. Coleman and Ralph P. Perkins, Midland, Mich., assignors to The Dow Chemical Company, Midland, Mich., a corporation of Michigan No Drawing. Application October 21, 1938,
Serial No. 236,166

12 Claims. (Cl. 260—612)

This invention concerns certain new alkylated diphenyloxide derivatives and mixtures thereof, as well as methods of making the same. The alkylated diphenyloxide products herein described are in most instances liquids at room temperature, although certain of the individual compounds are crystalline solids. Each of the new compounds contains eighteen or more carbon atoms in the molecule as a whole and contains at least one alkyl group having two or more carbon atoms. The products are particularly valuable as dielectric agents in transformers, condensers, and other electrical equipment and may also be employed as plasticizers in resins, varnishes, etc.

Our alkylated diphenyloxide products are prepared by reacting an alkyl halide, an olefine, or an alcohol other than ethyl alcohol with diphenyloxide in the presence of an alkylation catalyst, e. g., an activated bleaching earth such as "Tonsil" or "Retrol"; aluminum chloride, aluminum bromide, ferric chloride, boron trifluoride, etc. All such catalysts are known to be active in promoting Friedel-Crafts reactions and they are hereinafter referred to generically as "Friedel-Crafts catalysts". The catalyst is preferably employed in a proportion representing between 1.0 and 10.0 per cent by weight of the diphenyloxide, but may be employed in larger proportion if desired.

In carrying out the reaction, diphenyloxide or a lower alkylated diphenyloxide is heated with the catalyst, and the alkylating agent, i. e., alkyl halide, olefine, or alcohol, is introduced gradually and preferably with stirring while maintaining the mixture at a reaction temperature. In using an alkyl halide or an olefine as the alkylating agent, best results are obtained by employing a Friedel-Crafts catalyst of the metal halide type, preferably aluminum chloride, to promote the reaction, although acid activated bleaching earths may sometimes be used. In using an alcohol as the alkylating agent, the reaction usually proceeds most favorably in the presence of a bleaching earth as catalyst. Examples of alkyl halides, olefines, and alcohols which may be used in the reaction are: ethyl chloride, ethyl bromide, normal propyl bromide, isopropyl chloride, normal butyl chloride, secondary butyl chloride, isobutyl chloride, ethylene, propylene, normal butylene, isobutylene, normal butyl alcohol, tertiary octyl alcohol, lauryl alcohol, octadecyl alcohol, etc. The temperature required for the reaction varies somewhat with changes in the kind of alkylating agent employed, the kind and proportion of catalyst used in the reaction, and the extent of alkylation. However, the reaction usually occurs smoothly at temperatures between 125° and 175° C., but may be carried out at lower or higher temperatures, e. g., 50° or 275° C.

When the reaction is completed, the mixture is cooled, the catalyst is removed therefrom, and the unreacted diphenyloxide and alkylating agent are then distilled from the mixture. The residual product is usually a liquid mixture of alkyl diphenyloxides comprising isomeric compounds and non-uniformly alkylated compounds containing varying numbers of alkyl substituents. If desired, individual alkyl diphenyloxides may be separated from such mixtures by distillation or otherwise, but the mixtures themselves possess properties rendering them well suited to use for certain industrial purposes, e. g., as dielectric agents in transformers, condensers, or other electrical equipment, or as plasticizing agents for various synthetic resins, etc. Due to their relatively low viscosities and freezing points, the mixtures are usually more valuable than the individual alkyl diphenyloxides for such purposes.

By reacting diphenyloxide simultaneously or successively with two or more alkylating agents in the manner just described, an alkylated diphenyloxide mixture containing two or more different alkyl radicals may be produced. For instance, by reacting diphenyloxide directly with cracked oil gas, rich in ethylene, propylene, and butylene, and containing a small proportion of higher olefines, a complex alkylated diphenyloxide mixture may be produced containing a variety of simple and mixed alkyl diphenyloxides, which is permanently liquid at room temperature and well suited to use as a liquid dielectric agent.

The following examples illustrate a number of ways in which the principle of the invention has been employed but are not to be construed as limiting the invention.

Example 1

A mixture of 1700 grams (10 mols) of diphenyloxide and 26.6 grams (0.2 mol) of aluminum chloride was heated to and maintained at approximately 150° C. while 649 grams (10.06 mols) of ethyl chloride was passed into the same during a 14-hour period. The hydrogen chloride evolved during the reaction was collected by absorption in water, a total of 9.63 gram mols thereof being collected. The reacted mixture was cooled to below 100° C., washed successively with a concentrated hydrochloric acid solution and a dilute aqueous sodium carbonate solution and then dried over calcium chloride. There were obtained 1.9 kilograms of a mixture of ethylated diphenyloxides which was a thin nearly colorless oily liquid boiling for the most part over the range 126–185° C. under 5.5 millimeters pressure. The mixture was fractionally distilled under vacuum whereby the following individual compounds were separated:

| Compound | B. P. at 5.5 mm. pressure °C. | Sp. gr. at 20° C. | Index of refraction $n^{20}_D$ |
|---|---|---|---|
| Monoethyl-diphenyloxide | 126.5–127.5 | 1.034 | 1.565 |
| An isomeric monoethyldiphenyloxide | 134.5–136.5 | 1.033 | 1.565 |
| Diethyl-diphenyloxide | 148 –149 | 1.012 | 1.556 |
| An isomeric diethyldiphenyloxide | 157.5–162.5 | 1.003 | 1.553 |
| Triethyl-diphenyloxide | 166.5–171.5 | 0.986 | 1.551 |
| An isomeric triethyldiphenyloxide | 180.5–184.5 | 0.989 | 1.448 |

Each of said compounds was a liquid at room temperature. A small proportion of tetraethyl diphenyloxide was also obtained. The respective yields of monoethyl-, diethyl-, triethyl-, and tetraethyl-diphenyloxide, based on the diphenyloxide reacted, were approximately: monoethyl-diphenyloxide, 58%; diethyl-diphenyloxide, 30%; triethyl-diphenyloxide, 10%; and tetraethyl-diphenyloxide, 2%.

*Example 2*

A mixture of 1700 grams (10 mols) of diphenyloxide and 26.6 grams (0.2 mol) of aluminum chloride was maintained at 150° C. while 500 grams (11.9 mols) of propylene was passed into the same in 23 hours. The mixture was then cooled and washed to remove the aluminum chloride therefrom as in Example 1. There was obtained approximately 2150 grams of a substantially colorless liquid mixture of isopropyl-diphenyloxides, which distilled largely at temperatures between 113° and 195° C. under 6 millimeters pressure. The mixture was fractionally distilled under vacuum whereby the following individual liquid compounds were separated:

| Compound | B. P. at 6 mm. pressure °C. | Sp. gr. at 20° C. | Index of refraction $n^{20}_D$ |
|---|---|---|---|
| Mono-isopropyl-diphenyloxide | 143 – 4 | 1.022 | 1.588 |
| Di-isopropyl-diphenyloxide | 158 – 9 | 0.986 | 1.542 |
| An isomeric di-isopropyl-diphenyloxide | 169.5–172 | 0.987 | 1.545 |
| Tri-isopropyl-diphenyloxide | 185 –197.5 | 0.964 | 1.536 |

The respective yields of mono-isopropyl-, di-isopropyl-, and tri-isopropyl-diphenyloxide, based on the diphenyloxide reacted, were approximately: mono-isopropyl-diphenyloxide, 47%; di-isopropyl-diphenyloxide, 38%; and tri-isopropyl-diphenyloxide, 8%.

*Example 3*

814 grams (8.8 mols) of secondary butyl chloride was introduced gradually in a 2.5 hour period, into a mixture of 1700 grams (10 mols) of diphenyloxide and 26.6 grams (0.2 mol) of aluminum chloride while maintaining the mixture at approximately 100° C. Heating at the temperature just stated was continued for an additional 1.5 hours. Only 7.65 gram mols of hydrogen chloride was collected during the reaction, indicating that not all of the secondary butyl chloride employed had reacted. The reaction mixture was cooled, washed, and dried as in Example 1. The unreacted secondary butyl chloride was then distilled therefrom, leaving a colorless liquid mixture of secondary butyl diphenyloxides, which distilled for the most part at temperatures between 143° and 198° C. under 6 millimeters pressure. The mixture was fractionally distilled under vacuum, whereby the following new liquid compounds were separated:—

| Compound | B. P. at 6 mm. pressure °C. | Sp. Gr. at 20° C. | Index of refraction $n^{20}_D$ |
|---|---|---|---|
| Mono-secondary-butyl diphenyloxide | 143 – 6 | 1.010 | 1.551 |
| An isomeric mono-secondary-butyl-diphenyloxide | 155.3–158.3 | 1.010 | 1.553 |

Di-secondary-butyl- and tri-secondary-butyl diphenyloxides were also obtained from the mixture but were not purified sufficiently for determination of their physical constants. The respective yields of the mono-, di-, and tri-secondary-butyl-diphenyloxides were approximately 71, 24 and 5 per cent of theoretical, based on the diphenyloxide reacted.

*Example 4*

920 grams (9.95 mols) of tertiary butyl chloride was reacted at 100° C. with 1700 grams (10 mols) of diphenyloxide in the presence of 26.6 grams (0.2 mol) of aluminum chloride, the procedure being similar to that described in Example 3. The reaction mixture was then cooled, washed successively with aqueous hydrochloric acid and sodium carbonate solutions to remove the aluminum chloride, and dried over calcium chloride. There was obtained 2217 grams of a clear and substantially colorless liquid mixture of tertiary-butyl-diphenyloxides. It was fractionally distilled whereby was obtained: (1) a liquid mono-tertiary-butyl-diphenyloxide boiling at 150.5–152.5° C. under 6 millimeters pressure, specific gravity 1.008 at 20° C./4° C., and index of refraction $$n^{20}_D = 1.553$$

(2) an isomeric crystalline mono-tertiary-butyl-diphenyloxide boiling at 153.5–155.5° C. under 6 millimeters pressure and, after recrystallization from ethyl alcohol, melting at 54–54.5° C.; and (3) a liquid di-tertiary-butyl-diphenyloxide boiling at 191.3° C. under 6 millimeters pressure, specific gravity 0.972 at 20° C. and index of refraction $$n^{20}_D = 1.537$$

The liquid and crystalline mono-tertiary-butyl-diphenyloxides are believed to be the ortho and para isomers, respectively. The respective yields of the products just described, based on the diphenyloxide reacted, were approximately: liquid mono-tertiary-butyl-diphenyloxide 26%; crystalline mono-tertiary-butyl-diphenyloxide 41%; and di-tertiary-butyl-diphenyloxide 31% of theoretical.

*Example 5*

106.5 grams (8.7 mols) of tertiary amyl chloride of boiling point 83.7–84.5° C. at atmospheric pressure, was added in 3.5 hours to a mixture of 1530 grams (9 mols) of diphenyloxide and 26.6 grams (0.2 mol) of aluminum chloride while heating the reaction mixture at 75° C. After all of the tertiary amyl chloride was added, heating at the temperature just stated was continued for 1 hour. The reaction mixture was then washed successively with aqueous hydrochloric acid and sodium carbonate solutions and dried over calcium chloride. There was obtained 2050 grams of a liquid mixture of tertiary amyl diphenyloxides. The mixture was distilled under vacuum and the main portion thereof, which distilled at temperatures between 90° and 175° C. under 3 millimeters pressure, was a liquid having the following electrical properties: dielectric constant at 25° C., 2.94; electric power factor at 25° C., less than 0.0005; electric potential required to cause sparking through 0.1 inch of the material at 25° C., greater than 31,300 volts. The mixture was fractionally distilled, whereby there were obtained: (1) a liquid mono-tertiary-amyl-diphenyloxide having the physical constants:—boiling point 164.5–168.5° C. at 6 millimeters pressure, specific gravity 1.005 at 20° C., and index of refraction, $$n_D^{20} = 1.551$$

and (2) a liquid ditertiary-amyl-diphenyloxide having the physical constants:—boiling point 209.7–214.7° C. at 6 millimeters pressure, specific gravity 0.968 at 20° C., and index of refraction $$n_D^{20} = 1.537$$

A small proportion of tri-tertiary-amyl-diphenyloxide was also obtained. The yields of mono-tertiary-amyl-, di-tertiary-amyl-, and tri-tertiary-amyl-diphenyloxide, based on the diphenyloxide reacted, were approximately: 68%, 28%, and 0.5% of theoretical, respectively.

Example 6

958 grams (9 mols) of a mixture of isomeric amyl chlorides, from the chlorination of the pentane fraction of mineral oil, was added in 2.5 hours to a mixture of 1530 grams (9 mols) diphenyloxide and 26.6 grams (0.2 mol) aluminum chloride while heating the mixture at 75° C. The mixture was maintained at 75° C. for an additional 1 hour period, after which it was washed successively with aqueous solutions of hydrochloric acid and sodium carbonate and dried over calcium chloride. During the reaction 16 grams of amyl chloride was condensed from the hydrogen chloride gas evolved from the reaction.

An additional 165 grams of unreacted amyl chlorides was recovered by distillation from the main body of reaction products. The recovered amyl chlorides were apparently the higher boiling constituents of the amyl chloride mixture originally employed, indicating that the diphenyloxide had reacted selectively with the lower boiling isomeric amyl chlorides. After the removal of unreacted amyl chloride from the reaction products, there remained approximately 1.9 kilograms of a liquid mixture of amyl-diphenyloxides. The mixture was fractionally distilled under vacuum, whereby the following compounds were separated:

| Compound | B. P. °C. | Specific gravity | Index of refraction $n_D^{20}$ |
|---|---|---|---|
| Mono-amyl-diphenyl-oxide | 152.5–155.5 at 6 mm. | 1.001 at 20° C. | 1.548 |
| An isomeric-mono-amyl-diphenyloxide | 164.5–167.5 at 6 mm. | 1.002 at 20° C. | 1.550 |
| Di-amyl-diphenyloxide | 184.5–189.5 at 6 mm. | 0.964 at 20° C. | 1.533 |
| An isomeric di-amyl-diphenyloxide | 196.3–199.3 at 6 mm. | 0.971 at 20° C. | 1.537 |
| An isomeric di-amyl-diphenyloxide | 211.8–214.8 at 6 mm. | 0.956 at 20° C. | 1.533 |
| Probably tetra-amyl-diphenyloxide | 284.7–299.7 at 3 mm. | 1.056 at 40° C. | 1.537 |

Apparently little, if any, tri-amyl-diphenyloxide was formed in the reaction. The yields of mono-amyl-, di-amyl-, and tetra-amyl-diphenyloxide, based on the diphenyloxide reacted, were approximately 69%, 28% and 3% of theoretical, respectively.

Example 7

703 grams (5.96 mols) of di-isobutylene was added in 3.5 hours to a mixture of 1700 grams (10 mols) of diphenyloxide and 26.6 grams (0.2 mol) of aluminum chloride while maintaining the mixture at approximately 60° C. After completing the addition, the mixture was maintained at said temperature for an additional 0.5 hour. It was then washed successively with aqueous hydrochloric acid and aqueous sodium carbonate solutions, to remove the aluminum chloride therefrom, and dried over calcium chloride. There was obtained 2282 grams of a clear colorless liquid mixture of tertiary-butyl-diphenyloxides and tertiary-octyl-diphenyloxides having good dielectric properties. The mixture was fractionally distilled, whereby the following compounds were separated: (1) a crystalline mono-tertiary-butyl-diphenyloxide boiling at 154.5–159.3° C. under 6 millimeters and melting at 53.3–54° C. which is probably identical with the crystalline mono-tertiary-butyl-diphenyloxide described in Example 4; (2) a mono-actyl-diphenyloxide boiling at 184.5–188.5° C. under 6 millimeters pressure and having the specific gravity 0.940 at 20° C. and the index of refraction $$n_D^{20} = 1.542$$

(3) a compound having the empirical formula $C_{24}H_{34}O$, boiling at 218–223° C. under 6 millimeters pressure, and having the specific gravity 0.961 at 20° C. and the index of refraction $$n_D^{20} = 1.531$$

and (4) a compound of empirical formula $C_{38}H_{42}O$ having boiling point 229.5–239.5° C. under 6 millimeters pressure, specific gravity 0.952 at 20° C., and index of refraction $$n_D^{20} = 1.529$$

Example 8

A mixture containing 186 grams (1.0 mol) of lauryl alcohol, 85 grams (0.5 mol) of diphenyloxide, and 10 grams of "Retrol" was heated at a temperature of approximately 245° C. for 3 hours, during which time 17 grams of water was driven off. The reacted mixture was filtered while hot to remove the catalyst and was obtained as a light yellow liquid comprising a mixture of isomeric dodecyl diphenyloxides and a small amount of unreacted diphenyloxide and lauryl alcohol. The unreacted materials were distilled off under vacuum and the dodecyl diphenyloxide product was fractionally distilled, whereby the following products were separated:

| Product | B P. at 20 mm. pressure °C. | Sp. gr. at 20° C. | Index of refraction $n_D^{20}$ |
|---|---|---|---|
| Isomeric mono-dodecyl-diphenyloxides | 220–250 | 0.899 | 1.4968 |
| Mixture of mono- and di-dodecyl-diphenyloxides | 255–300 | 0.908 | 1.5020 |

Example 9

A mixture of 383 grams (1.5 mols) of heptadecanol-9, 126 grams (0.3 mol) of diphenyloxide, and 20 grams of "Retrol" was heated at a temperature of approximately 270°–300° C. for 8 hours as in Example 8. Upon completion of the reaction, the catalyst was filtered from the mixture and the latter was fractionally distilled under vacuum. The following products were obtained:

| Product | B. P. at 5 mm. pressure °C. | Specific gravity | Index of refraction $n_D^{20}$ |
|---|---|---|---|
| Mono-heptadecyldiphenyl-oxide | 250–275 | 0.908 at 25/25° C. | 1.511 |
| Isomeric mono-heptadecyl-diphenyloxide | 285–310 | 0.850 at 60/60° C. | 1.4636 |

The fraction distilling at 285°–310° C. under 5 millimeters pressure was a wax-like solid having a freezing point of approximately 48° C.

Example 10

In a manner similar to that employed in Examples 8 and 9, capryl alcohol was reacted with diphenyloxide, employing "Retrol" as a catalyst, to prepare mono- and di-decyl-diphenyloxides. The mixture of isomeric mono-decyl-diphenyloxides obtained was a light yellow liquid distilling at 205°–233° C. under 20 millimeters pressure, and having a specific gravity of about 0.960 at 25/25° C. and an index of refraction $$n_D^{20} = 1.5278$$

The mixture of isomeric di-decyl-diphenyloxides obtained was a yellow liquid distilling at 234°–257° C. under 5.5 millimeters pressure and having a specific gravity of about 0.930 at 25/25° C. and an index of refraction $$n_D^{20} = 1.5149$$

The products obtained in each of the foregoing examples possessed electrical characteristics, i. e., low dielectric constant, low power factor, high electrical resistance, and high breakdown potential, rendering them well adapted for use as dielectric agents.

In a similar manner other alkyl halides, olefines and alcohols, e. g., hexyl chlorides, bromides, or iodides, hexylenes, heptyl halides, heptylenes, heptyl alcohols, etc., may be reacted with diphenyloxide to form alkylated diphenyloxides. Also, a partially alkylated diphenyloxide such as ethyl or di-isopropyl-diphenyloxide may be reacted with an alkylating agent such as tertiary butyl chloride, isobutylene, or hexyl alcohol to form an alkylated diphenyloxide product containing two or more different alkyl radicals.

This application is a continuation-in-part of our co-pending application Serial No. 54,353, filed December 13, 1935.

Other modes of applying the principle of our invention may be employed instead of those explained, change being made as regards the methods and compounds herein disclosed, provided the step or compounds stated by any of the following claims or the equivalent of such stated steps or compounds be employed.

We therefore particularly point out and distinctly claim as our invention :

1. An alkylated diphenyloxide containing at least eighteen carbon atoms in the molecule as a whole and having at least one alkyl group containing not less than two carbon atoms.

2. A poly-alkyl-diphenyloxide containing at least eighteen carbon atoms in the molecule as a whole.

3. A mixture of alkylated diphenyloxides, prepared by reacting diphenyloxide with at least one compound selected from the class consisting of alkyl halides and olefines, and comprising as a major ingredient an alkylated diphenyloxide containing at least eighteen carbon atoms in the molecule as a whole and having at least one alkyl group containing not less than two carbon atoms.

4. A liquid non-uniformly alkylated diphenyloxide mixture comprising isopropyl- and poly-isopropyl-diphenyl-oxides as major ingredients and containing at least 20 per cent by weight of the poly-isopropyl-diphenyloxides.

5. Di-isopropyl-diphenyloxide, a liquid boiling at a temperature of approximately 158°–159° C. under 6 millimeters pressure and having a specific gravity of approximately 0.986 at 20° C.

6. A liquid non-uniformly alkylated mixture of alkyl diphenyloxides comprising butyl- and poly-butyl-diphenyloxides as major ingredients and containing at least 20 per cent by weight of the poly-butyl-diphenyloxides.

7. A liquid non-uniformly alkylated mixture of alkyl diphenyloxides comprising secondary-butyl- and poly-secondary-butyl-diphenyloxides as major ingredients and containing at least 20 per cent by weight of the poly-secondary-butyl-diphenyloxides.

8. The method which comprises reacting diphenyloxide with a compound selected from the class consisting of olefines and alkyl halides containing at least two carbon atoms in the presence of a Friedel-Crafts catalyst to form a mixture of mono-alkyl- and poly-alkyl-diphenyloxides and thereafter separating the mono-alkyl-diphenyloxide from the poly-alkyl-diphenyloxides.

9. The method which comprises reacting a compound selected from the class consisting of diphenyloxide and partially alkylated diphenyloxides with a compound selected from the class consisting of olefines and alkyl halides containing at least two carbon atoms in the presence of a Friedel-Crafts catalyst.

10. The method which comprises reacting diphenyloxide with sufficient propylene to form di-isopropyl-diphenyloxides, the reaction being carried out in the presence of aluminum chloride.

11. The method which comprises reacting diphenyloxide with a compound selected from the class consisting of butylenes and butyl halides in the presence of a Friedel-Crafts catalyst.

12. The method which comprises reacting secondary-butyl-chloride with diphenyloxide in the presence of aluminum chloride.

GERALD H. COLEMAN.
RALPH P. PERKINS.